March 22, 1932.  H. HACKER  1,850,076
VAPORIZER
Filed April 24, 1930
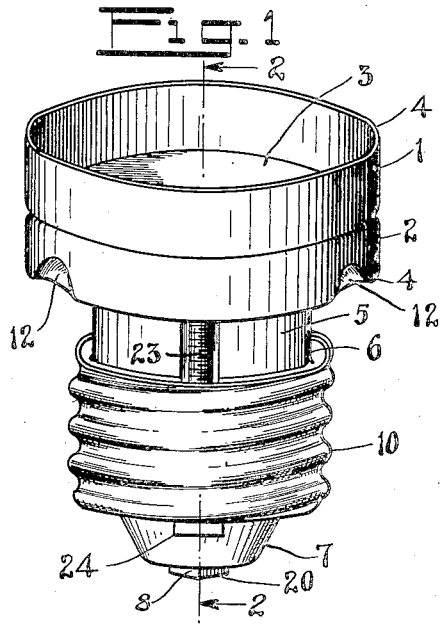
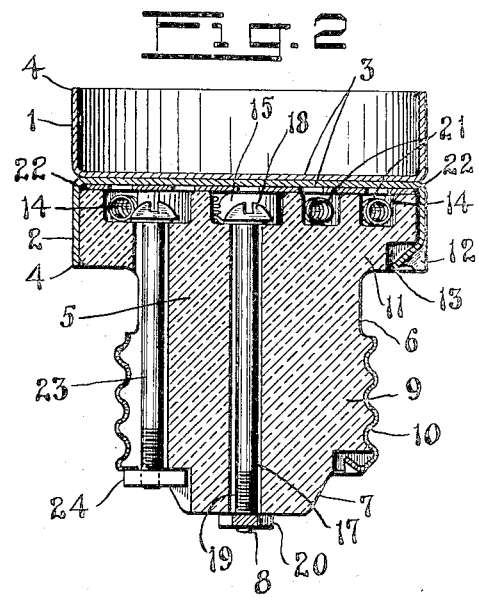
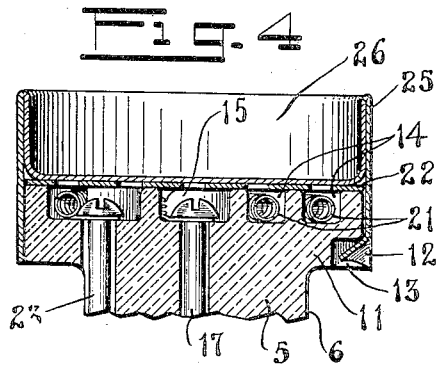
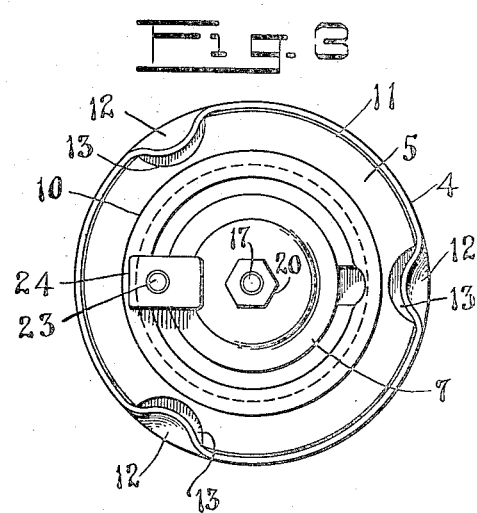
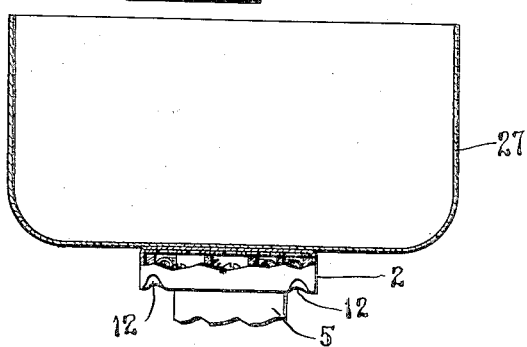
INVENTOR
HARRY HACKER
BY
*Harry D. Nims*
ATTORNEY Patented Mar. 22, 1932

1,850,076

UNITED STATES PATENT OFFICE

HARRY HACKER, OF NEW YORK, N. Y.

VAPORIZER

Application filed April 24, 1930. Serial No. 446,820.

This invention relates to an electrical device to be used as a receptacle for heating, dissolving or vaporizing chemicals or other substances.

One object of the invention is to provide a device of the above nature particularly adapted for use as a vaporizer of medicaments which may be used in connection with any ordinary electric lamp socket or electrical appliance outlet.

A further object is to provide a heating device of the above nature which will be simple and compact in construction and inexpensive to manufacture.

Another object is to provide a single unit a heating receptacle and heating element adapted to be used in combination with a lamp standard or a handle provided with the usual socket.

The embodiments of the invention are clearly illustrated by way of example in the accompanying drawings, in which similar characters of reference denote corresponding parts in all of the views, and in which Figure 1 is an enlarged front elevational view in perspective of one embodiment of the heating device.

Figure 2 is a cross-section through the line 2—2 of Figure 1, looking in the direction of the arrows.

Figure 3 is a bottom view of the heating device, illustrated in Figure 1.

Figure 4 is an enlarged cross sectional view of a modified form of heating device with the bottom portion broken away, illustrating a one piece receptacle and skirt; and Figure 5 is a full size cross sectional view of still another modified form of heating device also with the bottom portion broken away, illustrating an extra large receptacle used with small skirt portion.

The heating device illustrated in Figures 1 and 2 comprises two shell members (1) and (2) each provided with a bottom (3) and an encircling skirt portion (4).

The shell members (1) and (2) may be identical in size and shape, and are preferably made of brass or other suitable material having a relatively high heat conductivity. The shell members (1) and (2) are joined together in any suitable manner as for instance by spot-welding the bottom of each to the other. The heating unit which I have provided in connection with the receptacle consists preferably of a one piece body member (5) of porcelain or other insulating material. This member (5) has an intermediate cylindrical portion (6) below which is a conical lower section (7), adapted to serve as a seat for the center contact disk (8). The intermediate portion (6) is provided with a helical hub (9) at its lower end adapted to engage the threads of a screw shell (10) fitting over the body member (5), the exterior surface of said screw shell being adapted to engage the threads of the ordinary lamp socket. The upper portion of the body member (5) is enlarged so as to form a flange (11) around the periphery thereof. The under shell (2) of the receptacle is adapted to snugly engage the upper portion of said body member (5) and is secured thereto by means of depressions (12) in the depending skirt (4) engaging corresponding recesses (13) in the flange (11).

The top of the body member (5) is flat and is provided with a spiral groove (14) communicating at its inner end with an enlarged circular recess (15), leading to a vertical passage (16) through the body (5), said passage serving to receive a central terminal pin (17). The terminal pin (17) is provided with a slotted head (18) at its upper end and is threaded at its lower end (19) to receive a nut (20) which serves as the center contact of the plug. A heating coil (21) of usual construction is fitted within the spiral groove (14), said coil preferably being covered by a perforated mica disc (22), held in place by the depending shell (2) of the receptacle. One end of the coil (21) is secured to the upper end of the terminal pin (17) and the opposite end of said coil is secured to another pin (23) extending through the body member (5). The pin (23) is electrically connected to a metal member (24) which contacts with the threaded shell (10).

In operation when the circuit is closed through the spiral coil, the spiral coil becomes heated quickly, and the heat from this resistance wire is radiated partly through the perforations in the mica disc (22) and partly passes by conduction through the mica itself to the substance contained within the receptacle.

The invention is particularly well adapted for sick room use as the device may be connected to the ordinary bed lamp or lamp standard having a socket in the top thereof. If preferred, the device may also be used in combination with a portable handle or special stand for the purpose, provided with the usual electrical connections.

Other advantages of this invention reside in the compact nature of the heating device and the fact that it may be manufactured at a very low cost because of its simple construction and manner of assembly.

Another form which I have found suitable is that illustrated in Figure 4. In this form the receptacle (25) comprises a single shell having a depression (26) in the top thereof adapted to receive the substance to be heated.

The shell may be secured to the body member (5) in the manner already described and in this modification the depressed central portion (25) is supported upon the mica disc (22).

Still another form of receptacle which I have found suitable and which may be used in combination with the same body member as that previously described, is shown in Figure 5. In this modified form a larger receptacle (27) is provided, the size depending upon the purpose for which it is to be used. For example, it may be used as a sterilizer. The lower shell mounting (2) may be used for this larger receptacle as has been previously described in connection with my preferred form.

While I have described what I now believe to be the best embodiments of the invention I do not wish to be understood thereby as limiting the scope of the invention, as many changes and modifications may be made without departing from the spirit of the invention, all of which I aim to include in the scope of the appended claims.

I claim:

1. An electrical device of the character described comprising a shell member as a receptacle for containing material to be heated or vaporized, an oppositely disposed shell member of substantially like form connected to the bottom thereof, an electric heating member mounted within said oppositely disposed shell member and adjacent the top thereof, a mica disk having a plurality of perforations therein located between the heating member and the base of said receptacle and means adjacent said oppositely disposed shell member for connecting said receptacle to an electric light socket.

2. An electrical device of the character described comprising a receptacle for containing material to be heated or vaporized, a support for said receptacle comprising an inverted cup-shaped member, an electric heating member mounted within said support and adjacent the base of said receptacle and means for connecting said support to an electric source socket, part of said means extending up into said support and part extending below said support.

3. An electrical device of the character described, comprising a shell member as a receptacle for containing material to be heated or vaporized, an oppositely disposed shell member of substantially like form connected to the bottom thereof, a cylindrical member of insulating material adapted to support on its upper face an electric heating member, the upper portion of said cylindrical member being mounted within said oppositely disposed shell member and the lower part thereof being adapted for connection to an electric source socket.

4. An electrical device of the character described comprising in combination a receptacle for containing material to be heated or vaporized, a skirt portion depending from said receptacle and a heating unit comprising a cylindrical body member having an enlarged upper portion, said upper portion being surrounded by said skirt portion and having a groove in the upper face thereof, a heating coil disposed in said groove adjacent the base of said receptacle, said cylindrical body member being adapted to connect said heating coil to a source of electricity.

5. An electrical device of the character described comprising a receptacle for containing material to be heated or vaporized, a unit comprising a cylindrical body and an electric heating member in its top portion, a support for said receptacle having a depending skirt portion, said support being fastened to said receptacle and adapted to be mounted over and enclose the top portion of said cylindrical body and the said electric heating member, means on said skirt portion adapted to cooperate with means on said unit for connecting said support to said unit, the lower portion of said unit being adapted to connect said receptacle to an electric source socket.

6. In a device of the character described, the combination of a receptacle adapted to contain material to be heated or vaporized, a support connected to said receptacle comprising an inverted cup-shaped member, a cylindrical member adapted to be connected at its upper portion to said support and threaded at its lower portion for engagement with an electric source socket, an electric heating member mounted on the upper face of said cylindrical member between said cylindrical member and said support, and a perforated plate of dielectric material between said heating member and said support.

7. A device of the character described comprising a receptacle having a flat bottom, a support therefor consisting of an inverted cup-shaped member having a flat top, the bottom of said receptacle being connected to the top of said support, and a cylindrical member having an electric heating element in its upper portion and said upper portion being adapted to extend up into said support and be detachably held in position therein, the lower part of said cylindrical member extending below said support and being adapted for connection to an electric source socket.

HARRY HACKER.